United States Patent [19]

Didde et al.

[11] 3,766,425

[45] Oct. 16, 1973

[54] CONNECTION FOR THE SIGNAL PLATE OF A TELEVISION CAMERA TUBE

[75] Inventors: Alfonsus Augustinus Maria Didde; Gerard Johannes Petrus Velenturf, both of Emmasingel, Eindhoven, Netherlands

[73] Assignee: U.S. Philips Corporation, New York, N.Y.

[22] Filed: June 28, 1972

[21] Appl. No.: 267,253

[30] Foreign Application Priority Data

July 10, 1971 Netherlands .................... 71/09570

[52] U.S. Cl. ........................ 315/10, 315/11, 315/12

[51] Int. Cl. ........................ H01j 31/26

[58] Field of Search ........................ 315/10, 11, 12

[56] References Cited

UNITED STATES PATENTS

| | | | |
|---|---|---|---|
| 3,087,086 | 4/1963 | Turner | 315/12 X |
| 3,087,087 | 4/1963 | McNaney | 315/11 X |
| 3,102,212 | 8/1963 | Schlesinger | 315/12 |
| 3,325,673 | 6/1967 | Anderson | 315/12 |
| 3,649,866 | 3/1972 | Salgo | 315/12 X |

*Primary Examiner*—Carl D. Quarforth
*Assistant Examiner*—P. A. Nelson
*Attorney*—Frank R. Trifari

[57] ABSTRACT

The external contact with the signal electrode in a television camera tube is provided by means of an adapter plug arranged in a housing for the coils. The adapter plug is provided with standard parts at the end of the plug for shielding the conductor.

4 Claims, 2 Drawing Figures

CONNECTION FOR THE SIGNAL PLATE OF A TELEVISION CAMERA TUBE

Figure 1:
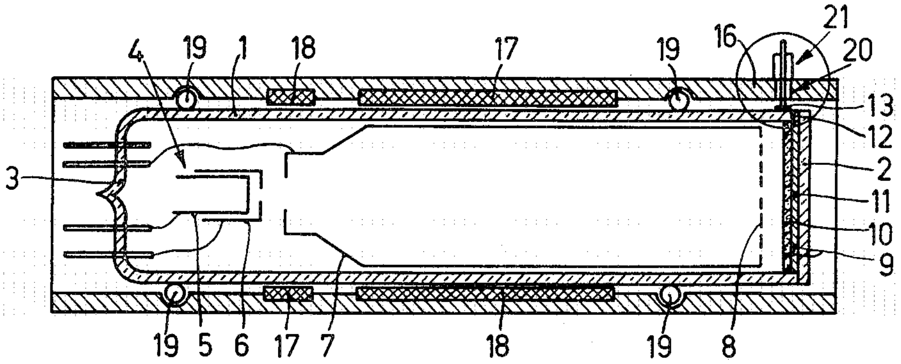

The invention relates to a television camera tube having an entrance window and a target which is arranged near the entrance window and which is connected in an electrically conductive manner to a signal-electrode contact which is provided on the outside of the tube wall near the entrance window, said television camera tube being provided with a coil system which is concentrically arranged about the tube.

In known television camera tubes of this kind the connection between a video amplifier and the signal electrode, fed through the tube wall, is realized by a soldered connection, via a hole in a structural part of a coil housing, to a contact spring for the signal plate contact which is arranged inside the structural part. This has the drawback that often poor and vulnerable connections are established due to the poor accessibility of the soldering area. Moreover, when use is made of a connection of this kind, interference signals caused by the electrical fields often give rise to problems, in particular in devices in which comparatively high electrical voltages occur comparatively near to the television camera tube.

The invention has for its object to obviate these drawbacks and to this end a television camera tube of the kind set forth is characterized in that in a structural part of a coil housing for the coil system, an adapter plug is provided near the signal electrode contact, for establishing an electrical contact through the structural part.

Due to the use of an adapter plug for the electrical contact with the signal plate, a short and reliable connection is realized. If the adapter plug is provided with a standardized plug end, the connection can be readily effected under all circumstances and a proper, interference-free contact can be established, if desired.

Figure 2:
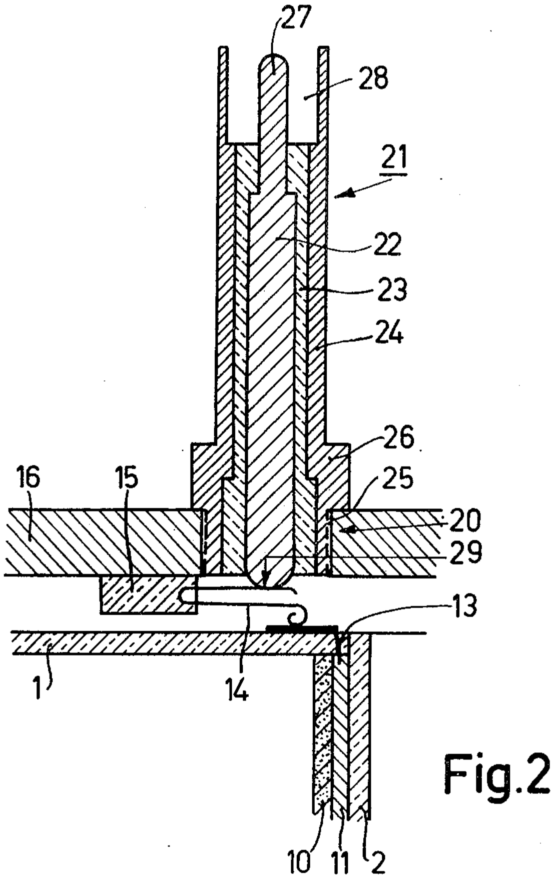

One preferred embodiment according to the invention will be described in detail hereinafter with reference to the drawing. In the drawing:

FIG. 1 shows a television camera tube provided with a signal plate connection according to the invention, and FIG. 2 is an enlarged view of the portion which is encircled in FIG. 1.

In a television camera tube as shown in FIG. 1 are provided, inside the tube wall formed by a cylinder portion 1, an entrance window 2 and a tube base 3, an electron gun 4 having a cathode 5, a Wehnelt 6 and an anode 7. Provided near the entrance window are a gauze electrode 8 and a target 9. The target 9 can be composed, for example, of a layer of photosensitive material 10, such as, for example, lead monoxide or antimony trisulphide, and a signal electrode 11 which is made of, for example, tin oxide. Both layers can be provided on the inner side of the entrance window 2, for example, by vapour deposition in a correct sequence. The target can also be formed by a disc of semiconductor material such as silicon in which a mosaic of *p-n* junctions is provided. The intrinsic material can then act as the signal electrode. Via an electrically conductive passage 12, the signal electrode 11 is connected to a signal electrode contact 13. The signal electrode contact preferably consists of a strip of a conductive material which is provided about the tube, but may also have a different shape. The signal electrode contact is subjected to the force of a metal contact spring 14, which is mounted on a coil housing 16 by means of an electrically insulating construction element 15 which is made, for example, of a synthetic resin material. The coil housing 16 is formed by a cylindrical bushing. Provided in the jacket of this bushing are inter alia deflection coils 17 and focusing coils 18. The coil housing 16 is mounted to be concentrical about the cylinder wall 1 by means of resilient, adjustable push-buttons 19. The coil housing 16 preferably also comprises a screening bushing, not shown in the Figure, so as to protect the television camera tube against interfering external magnetic fields, and for this purpose, among others, it will preferably envelop the entire cylinder wall 1. In a portion of the coil housing 16 which is opposite to the signal electrode contact an opening 20 is provided through which an electrically conductive connection is established with the signal electrode contact 13, via the contact spring 14, by means of an adapter plug 21 according to the invention.

A preferred embodiment of an adapter 21 as shown in FIG. 2 comprises an electrically conductive cylindrical mandrel 22 which is enveloped by an insulator 23 about which a metal bushing 24 is provided. The bushing 24 is mounted in the opening 20 of the coil support 16 by means of a screwthread. The mounting distance between one end 29 of the mandrel 22 and the cylinder wall 1 of the television camera tube is then determined by a collar 16. A mandrel end 27 on an opposite end constitutes a standardized plug connection which can be rendered interference-free by means of a raised edge 25 of the bushing 24. The contact spring 14 provides the contact between the mandrel 22 and the signal electrode contact 13. The contact spring is preferably made of a resilient wire which forms an eyelet in a plane transverse to the mandrel direction so as to establish the contact with the mandrel, the ends of said spring forming a double contact with the signal electrode contact. The two separate contacts with the signal electrode contact are then shifted over the cylinder wall, in an angular sense with respect to each other.

A signal electrode connection as described above can be readily screened against interference fields and, consequently, it is particularly suitable for use in apparatus where a device to be operated with high electrical voltages is arranged near the television camera tube. Examples in this respect are a videophone in which a television monitor is arranged near the camera tube, an X-ray apparatus provided with a television camera tube, an electron microscope or a similar apparatus. If desired, a standardized female plug adapted to the plug can form part of a printed circuit so that a very short connection can be realized.

What is claimed is:

1. A television camera assembly comprising a camera tube, said tube comprising an envelope having a window at one end, means within the envelope of said tube for transforming images received through said window into electrical signals, and a signal electrode contact arranged on said envelope for providing an electrical circuit through said envelope for said electrical signals, and a housing arranged to surround said envelope, said housing comprising a substantially tubular member open at the window end of said envelope, means for securing said envelope within said tubular member, coils for controlling electron paths within said envelope embedded within said tubular member, and means for providing an electrical circuit through said tubular member for the electrical signals from said signal electrode contact, said means for providing an electrical circuit through said tubular member comprising an adapter plug traversing said tubular member in proximity to the signal electrode contact on said envelope and having the inner end thereof provided with means for electrically contacting said signal electrode contact.

2. A television camera assembly as claimed in claim 1, wherein said adapter plug comprises a standard terminal at the end of said plug projecting from said housing.

3. A television camera assembly as claimed in claim 2, wherein said standard terminal comprises shielding from interfering electromagnetic fields produced during high voltage operation of said tube.

4. A housing for a television camera tube comprising a member for enclosing the windowless walls of the envelope of said tube, means for securing said member to the envelope of said tube, means embedded within said member for controlling electrons within said tube, and an adapter plug for providing an external connection for signals produced within said tube, said adapter plug passing through the walls of said member in proximity to a signal electrode contact on the envelope of said tube.

* * * * *